United States Patent
Lei et al.

(10) Patent No.: US 9,086,181 B2
(45) Date of Patent: Jul. 21, 2015

(54) CONNECTING STRUCTURE BETWEEN VOLUTE OF BLOWER AND CONVERSION INTERFACE

(71) Applicant: Zhongshan Broad-Ocean Motor Co., Ltd., Zhongshan (CN)

(72) Inventors: Wei Lei, Zhongshan (CN); Song Jia, Zhongshan (CN); Yunyi Luo, Zhongshan (CN); Wenbo Yang, Zhongshan (CN); Jianhua Zeng, Zhongshan (CN); Xianjun Liu, Zhongshan (CN)

(73) Assignee: ZHONGSHAN BROAD-OCEAN MOTOR CO., LTD., Zhongsham (CN)

( * ) Notice: Subject to any disclaimer, the term of this patent is extended or adjusted under 35 U.S.C. 154(b) by 235 days.

(21) Appl. No.: 13/844,333

(22) Filed: Mar. 15, 2013

(65) Prior Publication Data

US 2014/0035271 A1    Feb. 6, 2014

(30) Foreign Application Priority Data

Jul. 31, 2012    (CN) .......................... 2012 2 0376885

(51) Int. Cl.
| | |
|---|---|
| *F16L 23/00* | (2006.01) |
| *F16L 55/07* | (2006.01) |
| *F16L 37/26* | (2006.01) |
| *B60H 1/00* | (2006.01) |
| *F04D 29/42* | (2006.01) |
| *F04D 29/62* | (2006.01) |

(52) U.S. Cl.
CPC ............ *F16L 55/07* (2013.01); *B60H 1/00564* (2013.01); *F04D 29/4226* (2013.01); *F16L 37/26* (2013.01); *F04D 29/626* (2013.01); *F05D 2260/602* (2013.01)

(58) Field of Classification Search
CPC .... F16L 37/26; F04D 29/4226; F04D 29/626; F05D 2260/602
USPC .......................................... 285/367, 410, 325
See application file for complete search history.

(56) References Cited

U.S. PATENT DOCUMENTS

| | | | | |
|---|---|---|---|---|
| 283,771 | A * | 8/1883 | Genin ............................ | 285/325 |
| 4,037,654 | A * | 7/1977 | Lien ............................... | 285/325 |
| 4,327,942 | A * | 5/1982 | Abbes et al. ................... | 285/325 |
| 5,383,691 | A * | 1/1995 | Anthony ........................ | 285/325 |
| 6,364,372 | B1 * | 4/2002 | Marandi ........................ | 285/367 |

\* cited by examiner

*Primary Examiner* — David E Bochna
(74) *Attorney, Agent, or Firm* — Matthias Scholl P.C.; Matthias Scholl

(57) ABSTRACT

A connecting structure, including: a volute including an air inlet and an air outlet; and a conversion interface. A connecting part is disposed on an outer side of the air outlet. The connecting part includes: a lower plate; a lower lug protruding outward from each end of the lower plate; and an upper flange disposed above the lower plate. The conversion interface includes a sleeve. An upper plate protrudes from a rear part of the sleeve. Two upper lugs protrude outward from two ends of the upper plate, respectively. A lower flange is disposed on the rear part of the sleeve beneath the upper plate. The upper plate is disposed on the upper flange. The lower flange is disposed on a curved convex block that protrudes upward from an outer edge of the lower plate. The upper lug is disposed on the lower lug.

6 Claims, 4 Drawing Sheets

CONNECTING STRUCTURE BETWEEN VOLUTE OF BLOWER AND CONVERSION INTERFACE

CROSS-REFERENCE TO RELATED APPLICATIONS

Pursuant to 35 U.S.C. §119 and the Paris Convention Treaty, this application claims the benefit of Chinese Patent Application No. 201220376885.1 filed Jul. 31, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a connecting structure between a volute of a blower and a conversion interface.

2. Description of the Related Art

A conversion interface is usually used to connect to an outer air pipe and a volute of a blower and functions in transferring. A conventional connecting structure between the volute of the blower and the conversion interface includes a connecting plate which connects the volute of the blower to the conversion interface via a bolt or a rivet. However, the connecting structure has the following problems: 1) the structure has a complicated structure, which results in a complicated production process, inconvenience in assembling, and high production cost; 2) the connecting structure is provided with a plurality of parts, thus, it is complicatedly designed, and has a high production cost; and 3) the connecting structure has an infirm connection, poor stability, which is very easy to loosen.

SUMMARY OF THE INVENTION

In view of the above-described problems, it is one objective of the invention to provide a connecting structure between a volute of a blower and a conversion interface that has a simple structure, low production cost, firm connection, and high stability, and is very simple to assemble.

To achieve the above objective, in accordance with one embodiment of the invention, there is provided a connecting structure between a volute of a blower and a conversion interface comprises: the volute, the volute comprising an air inlet, and an air outlet; and the conversion interface. A connecting part is disposed on an outer side of the air outlet. The connecting part comprises: a lower plate; a lower lug comprising a boss, an upper flange, and a curved convex block. Two lower lugs protrude outward from two ends of the lower plate, respectively. The upper flange is disposed above the lower plate. The curved convex block protrudes upward from an outer edge of the lower plate. An end surface of the lower lug is convex to form the boss. The conversion interface comprises: a sleeve, an upper plate, an upper lug comprising a mounting hole, and a lower flange. The upper plate protrudes from a rear part of the sleeve. Two upper lugs protrude outward from two ends of the upper plate, respectively. The lower flange is disposed on the rear part of the sleeve beneath the upper plate. The mounting hole is arranged on a bottom of the upper lug. The upper plate is disposed on the upper flange. The lower flange is disposed on the curved convex block. The upper lug is disposed on the lower lug. The boss of the lower lug is received by the mounting hole of the upper lug.

In a class of this embodiment, the upper plate is a semicircular plate.

In a class of this embodiment, the lower plate is a semicircular plate.

In a class of this embodiment, a through hole is arranged on a middle part of the boss.

In a class of this embodiment, a water drainage pipe is arranged on a bottom of the sleeve.

Advantages of the invention are summarized as follows:

1) The conversion interface comprises: the sleeve. The upper plate protrudes from the rear part of the sleeve. Two upper lugs protrude outward from two ends of the upper plate, respectively. The lower flange is disposed on the rear part of the sleeve beneath the upper plate. The mounting hole is arranged on a bottom of the upper lug. The upper plate is disposed on the upper flange. The lower flange is disposed on the curved convex block which protrudes upward from the outer edge of the lower plate. The upper lug is disposed on the lower lug. The boss protruding from the end face of the lower lug is received by the mounting hole of the upper lug. Thus, the invention decreases the use of the connecting plate and the bolt, lowers the production cost, simplifies the production process, and saves the labor cost; besides, the invention has a firm connection and high stability.
2) The through hole is arranged on the middle part of the boss, and a bolt passes the through hole and is connected to an outer device for fastening the conversion interface.
3) The water drainage pipe is arranged on the bottom of the sleeve, condensed water inside the volute is drained out via the water drainage pipe, and thus the structure is reasonably designed.

DETAILED DESCRIPTION OF THE EMBODIMENTS

For further illustrating the invention, experiments detailing a connecting structure between a volute of a blower and a conversion interface are described below combined with the drawings.

Example 1

Figure 1:
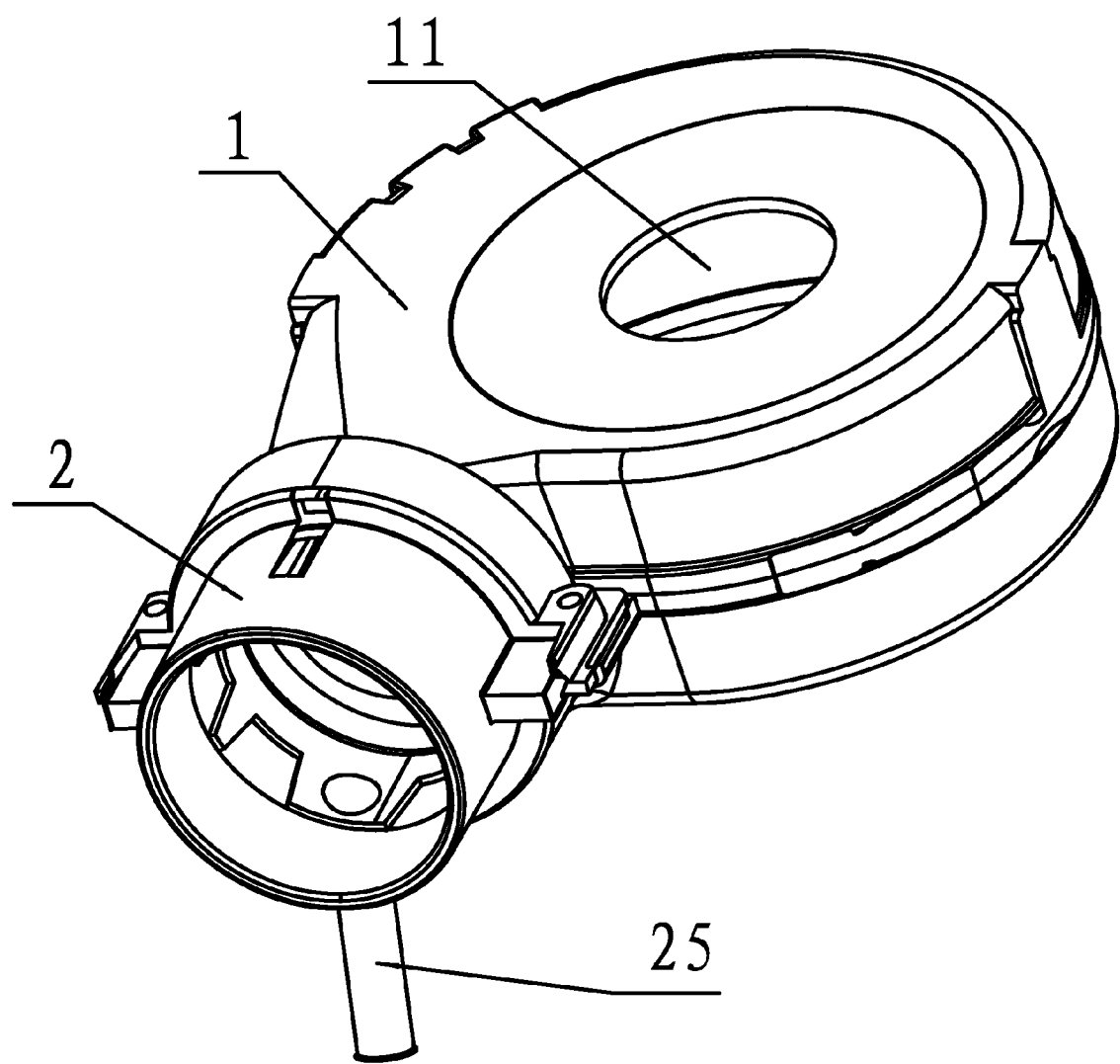
FIG. 1 is a stereogram of a connecting structure between a volute of a blower and a conversion interface of the invention.
Figure 2:
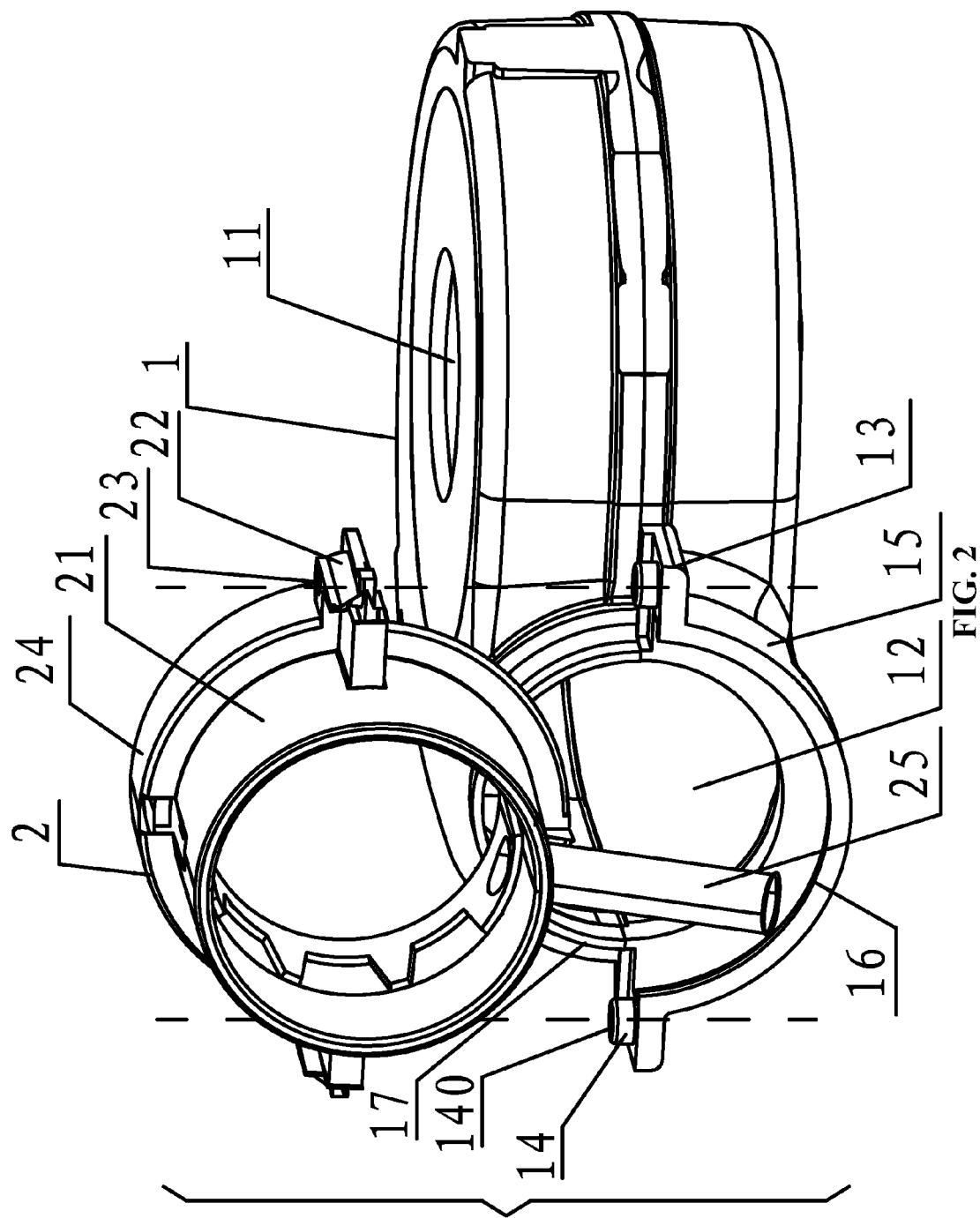
FIG. 2 is an exploded view of the invention.
Figure 3:
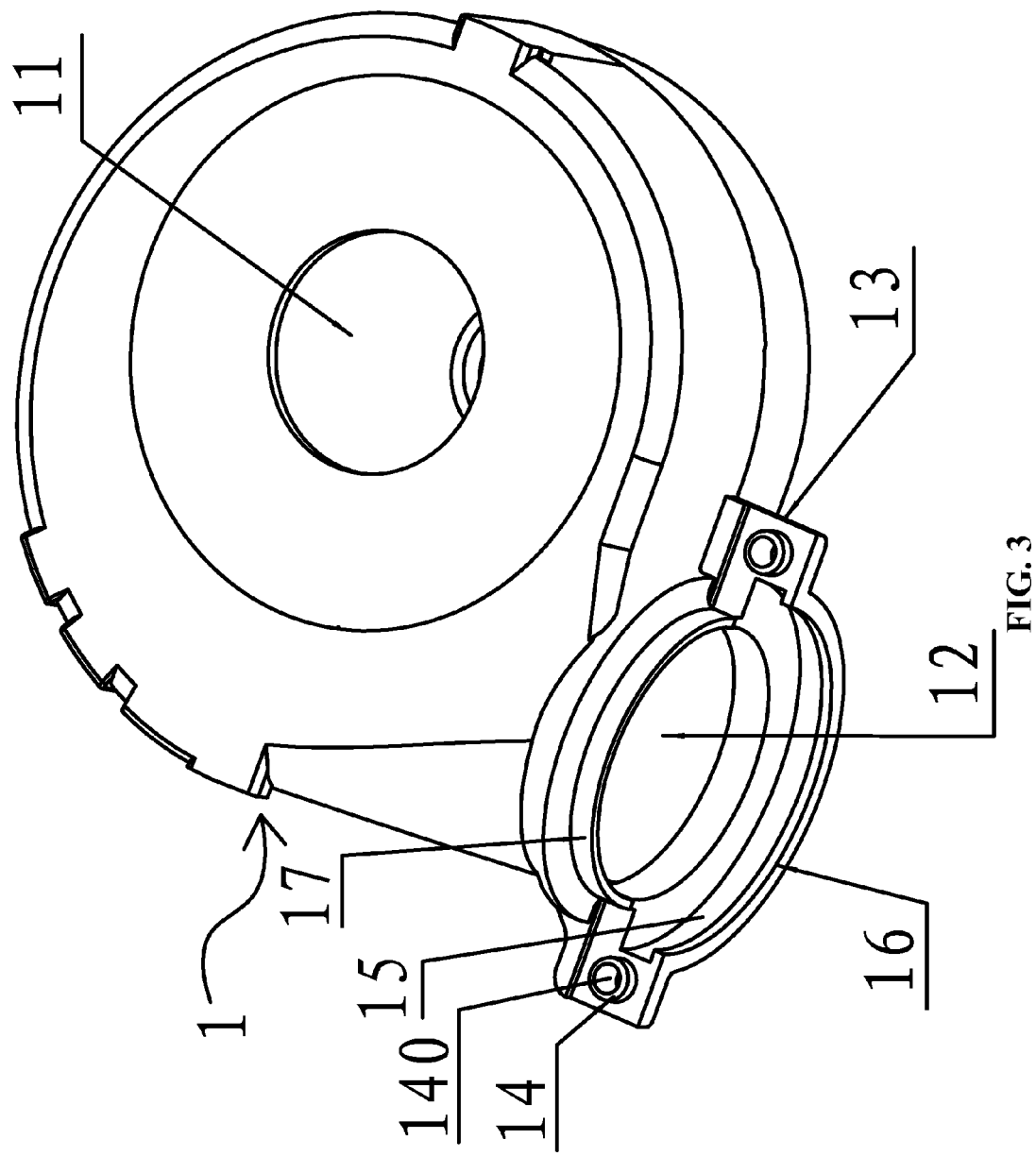
FIG. 3 is a stereogram of a volute of the invention.
Figure 4:
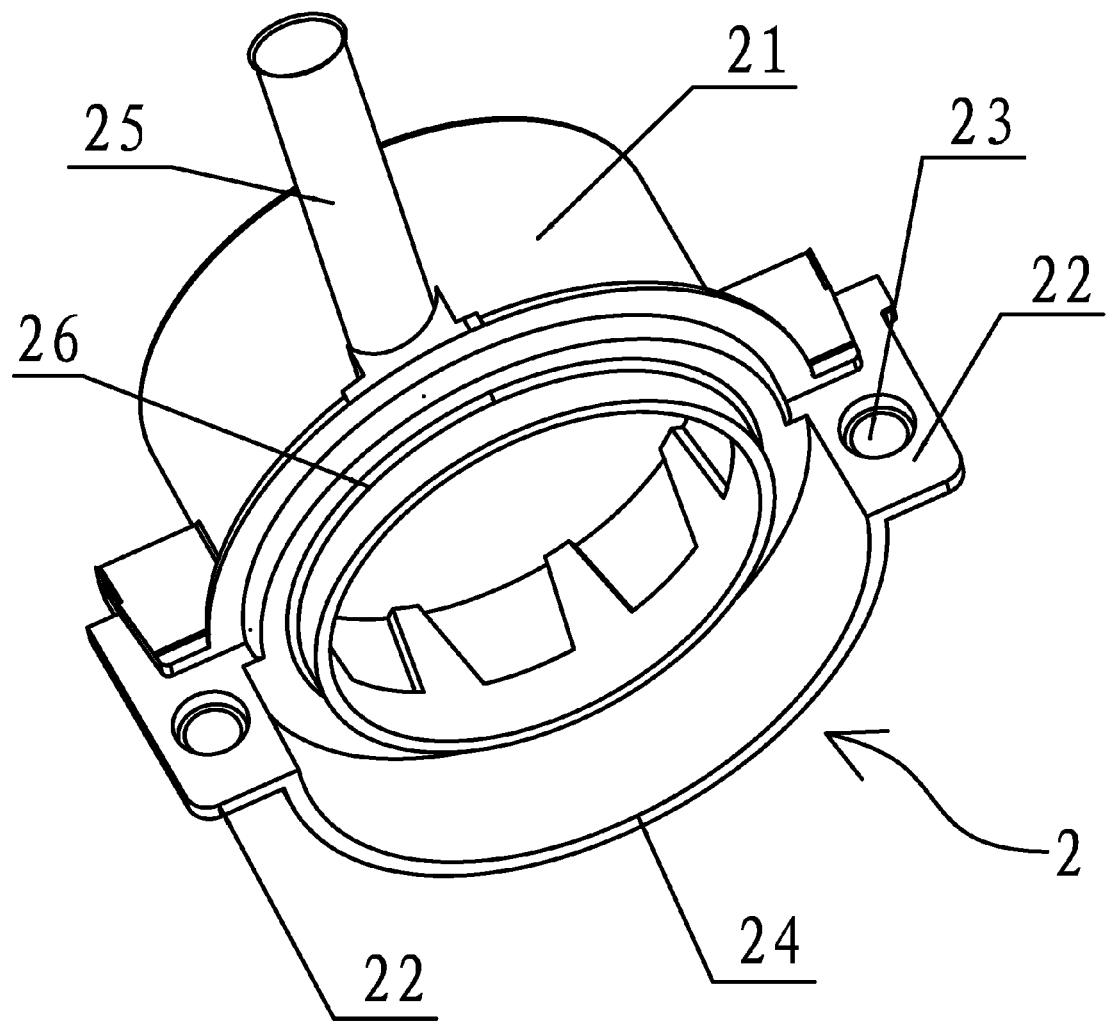
FIG. 4 is a stereogram of a conversion interface of the invention.

As shown in FIGS. 1-4, a connecting structure between a volute of a blower and a conversion interface comprises: the volute 1, the volute comprising an air inlet 11, and an air outlet 12; and the conversion interface 2. A connecting part is disposed on an outer side of the air outlet 12. The connecting part comprises: a lower plate 15; a lower lug 13 comprising a boss 14, an upper flange 17, and a curved convex block 16. Two lower lugs 13 protrude outward from two ends of the lower plate 15, respectively. The upper flange 17 is disposed above the lower plate 15. The curved convex block 16 protrudes upward from an outer edge of the lower plate 15. An end surface of the lower lug 13 is convex to form the boss 14. The conversion interface 2 comprises: a sleeve 21, an upper plate 24, an upper lug 22 comprising a mounting hole 23, and a lower flange 26. The upper plate 24 protrudes from a rear part of the sleeve 21. Two upper lugs 22 protrude outward from two ends of the upper plate 24, respectively. The lower flange 26 is disposed on the rear part of the sleeve 21 beneath the upper plate 24. The mounting hole is arranged on a bottom of the upper lug 22. The upper plate 24 is disposed on the upper flange 17. The lower flange 26 is disposed on the curved convex block 16. The upper lug 22 is disposed on the lower lug 13. The boss 14 of the lower lug 13 is received by the mounting hole 23 of the upper lug 22.

Example 2

Based on Example 1, the following technical feature is added: the upper plate 24 is a semicircular plate.

Example 3

Based on Example 1 or 2, the following technical feature is added: the lower plate 15 is a semicircular plate.

Example 4

Based on Example 1, the following technical feature is added: a through hole 140 is arranged on a middle part of the boss 14.

Example 5

Based on Example 1, the following technical feature is added: a water drainage pipe 25 is arranged on a bottom of the sleeve 21.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The conversion interface 2 comprises: the sleeve 21. The upper plate 24 protrudes from the rear part of the sleeve 21. Two upper lugs 22 protrude outward from two ends of the upper plate 24, respectively. The lower flange 26 is disposed on the rear part of the sleeve 21 beneath the upper plate 24. The mounting hole is arranged on a bottom of the upper lug 22. The upper plate 24 is disposed on the upper flange 17. The lower flange 26 is disposed on the curved convex block 16 which protrudes upward from the outer edge of the lower plate. The upper lug 22 is disposed on the lower lug 13. The boss 14 protruding from the end face of the lower lug 13 is received by the mounting hole 23 of the upper lug 22. Thus, the invention decreases the use of the connecting plate and the bolt, lowers the production cost, simplifies the production process, and saves the labor cost; besides, the invention has a firm connection and high stability.

The invention claimed is:

1. A connecting structure, comprising:
   a) a volute (1), the volute comprising an air inlet (11), and an air outlet (12); and
   b) a conversion interface (2);
   wherein:
   a connecting part is disposed on an outer side of the air outlet (12);
   the connecting part comprises: a lower plate (15); two lower lugs (13) each comprising a boss (14), an upper flange (17), and a curved convex block (16);
   the two lower lugs (13) protrude outward from two ends of the lower plate (15), respectively; the upper flange (17) is disposed above the lower plate (15); the curved convex block (16) protrudes upward from an outer edge of the lower plate (15); and the boss (14) is in a cylindrical shape and extends from an end surface of the lower lug (13);
   the conversion interface (2) comprises: a sleeve (21), an upper plate (24), two upper lugs (22) each comprising a mounting hole (23), and a lower flange (26);
   the upper plate (24) protrudes from a rear part of the sleeve (21); the two upper lugs (22) protrude outward from two ends of the upper plate (24), respectively; the lower flange (26) is disposed on the rear part of the sleeve (21) beneath the upper plate (24); and the mounting hole is arranged on a bottom of the upper lug (22); and
   the upper plate (24) is disposed on the upper flange (17); the lower flange (26) is disposed on the curved convex block (16); the upper lug (22) is disposed on the lower lug (13); and the boss (14) of the lower lug (13) is received by the mounting hole (23) of the upper lug (22).

2. The connecting structure of claim 1, wherein the upper plate (24) is a semicircular plate.

3. The connecting structure of claim 2, wherein the lower plate (15) is a semicircular plate.

4. The connecting structure of claim 1, wherein the lower plate (15) is a semicircular plate.

5. The connecting structure of claim 1, wherein a through hole (140) is arranged on a middle part of the boss (14).

6. The connecting structure of claim 1, wherein a water drainage pipe (25) is arranged on a bottom of the sleeve (21).

* * * * *